US008768591B2

(12) United States Patent
Vollert et al.

(10) Patent No.: US 8,768,591 B2
(45) Date of Patent: Jul. 1, 2014

(54) METHOD FOR OPERATING A BOOSTED BRAKE SYSTEM OF A VEHICLE AND CONTROL DEVICE FOR A BOOSTED BRAKE SYSTEM OF A VEHICLE

(75) Inventors: Herbert Vollert, Vaihingen/Enz (DE); Frank Kneip, Hutschenhausen (DE); Dirk Mahnkopf, Eglosheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/262,272

(22) PCT Filed: Mar. 19, 2010

(86) PCT No.: PCT/EP2010/051827
§ 371 (c)(1),
(2), (4) Date: Sep. 30, 2011

(87) PCT Pub. No.: WO2010/118901
PCT Pub. Date: Oct. 21, 2010

(65) Prior Publication Data
US 2012/0041662 A1      Feb. 16, 2012

(30) Foreign Application Priority Data

Apr. 14, 2009    (DE) .......................... 10 2009 002 359

(51) Int. Cl.
*B60T 8/1755*       (2006.01)

(52) U.S. Cl.
USPC ............ 701/70; 701/112; 303/114.3; 303/13; 303/3; 303/9.66; 60/545; 60/553

(58) Field of Classification Search
CPC ......... B60T 8/1755; B60T 8/172; B60T 7/22; B60W 10/184; B60W 10/18
USPC ............... 701/58, 104, 22, 70, 78; 74/473.14, 74/502.6; 91/369.2; 477/107, 111, 172, 477/68; 60/545; 303/113.1
See application file for complete search history.

(56) References Cited

U.S. PATENT DOCUMENTS 6,691,602 B1 *  2/2004  Harth et al. .................. 91/369.2
6,899,010 B2 *  5/2005  Takayama et al. ........... 91/369.1
(Continued)

FOREIGN PATENT DOCUMENTS

CN          1603186       4/2005
DE          10055715      5/2001
(Continued)

OTHER PUBLICATIONS

PCT/EP2010/051827 International Search Report.

*Primary Examiner* — Tuan C. To
*Assistant Examiner* — Jelani Smith
(74) *Attorney, Agent, or Firm* — Michael Best & Friedrich LLP

(57) ABSTRACT

The invention relates to a method for operating a brake boosted brake system of a vehicle, comprising the monitoring of a mode of operation of the brake boosted brake system with regard to agreement of a total braking torque applied to at least one wheel of the vehicle by the brake boosted brake system with a specified target total braking torque and/or with regard to a displacement of a brake medium volume of the brake boosted brake system to a force/pressure conversion element (22) of the brake boosted brake system, if a braking torque difference between the applied total braking torque and the specified target total braking torque is greater than a specified reference difference, and/or if the brake medium volume displaced to the force/pressure conversion element (22) is larger than a specified reference volume; further comprising the defining of a target boosting force change with regard to a boosting force (Fu) provided by a brake booster (14) of the brake boosted brake system, taking into account the braking torque difference and/or the displaced brake medium volume, and outputting the target boosting force change to the brake booster (14). The invention further relates to a corresponding control device for a brake boosted brake system of a vehicle.

14 Claims, 5 Drawing Sheets

(56) References Cited

U.S. PATENT DOCUMENTS

| | | |
|---|---|---|
| 7,086,320 B2 * | 8/2006 | Villamayor ................. 91/369.2 |
| 2008/0179941 A1 | 7/2008 | Matsushita |
| 2008/0319624 A1 * | 12/2008 | Aizawa et al. ................. 701/70 |
| 2009/0072615 A1 * | 3/2009 | Oosawa et al. ............ 303/113.1 |
| 2010/0049415 A1 * | 2/2010 | Bauerle ........................... 701/78 |
| 2010/0174431 A1 * | 7/2010 | Fukumura et al. .............. 701/22 |

FOREIGN PATENT DOCUMENTS

| | | |
|---|---|---|
| DE | 10057557 | 12/2001 |
| JP | 2001225739 | 8/2001 |
| JP | 2002002478 | 1/2002 |
| WO | 2004110840 | 12/2004 |
| WO | 2006125547 | 11/2006 |

* cited by examiner

METHOD FOR OPERATING A BOOSTED BRAKE SYSTEM OF A VEHICLE AND CONTROL DEVICE FOR A BOOSTED BRAKE SYSTEM OF A VEHICLE

BACKGROUND OF THE INVENTION

The invention relates to a method of a boosted brake system of a vehicle. Furthermore, the invention relates to a control device for a boosted brake system of a vehicle.

In order to permit a driver of a vehicle to comfortably activate an activation element of a brake system, such as for example a brake pedal, a brake system generally has a brake booster. The brake system with a brake booster is often referred to as a boosted brake system.

A brake booster is configured to make available an assistance force which, in addition to a driver braking force applied to the activation element by the driver, causes at least one wheel to be braked. Suitable brake boosters are described, for example, in DE 10 2005 024 577 A1, DE 10057 557 A1 and DE 103 27 553 A1.

FIGS. 1A and B show schematic illustrations explaining a method of functioning of a conventional brake booster.

The brake system represented partially schematically in FIG. 1A has an activation element 10 which is embodied, for example, as a brake pedal. By activating the activation element 10, the driver can apply a driver braking force Ff and a first adjustment travel s1 to a transmitting component of the brake system, for example to an input piston 12 (see equivalent circuit diagram in FIG. 1B). In addition, the driver braking force Ff can be sensed by means of an activation element sensor system (not included in the sketch). The activation element sensor system comprises, for example, a force sensor for measuring the driver braking force Ff and/or a travel sensor for determining the first adjustment travel s1 of an adjustable component of the activation element 10.

The brake system additionally has a brake booster 14. The brake booster 14 is configured to make available an assistance force Fu so that the driver does not have to completely provide the force, as a driver braking force Ff, which is required to brake his vehicle. The assistance force Fu which is made available by the brake booster 14 can be, for example, a function of the driver braking force Ff.

The activation element 10 and the brake booster 14 are therefore arranged in the brake system in such a way that at least the driver braking force Ff and the assistance force Fu give rise to an overall braking force Fg. However, the overall braking force Fg can still comprise at least one further force. For example, the brake booster 14 transmits the assistance force Fu and a second adjustment travel s2 to an assistance piston 16 which is coupled, together with the input piston 12, to a coupling element, such as the reaction plate 18 which is shown. In the equivalent circuit diagram in FIG. 1B, the input piston 12 acts on a first point P1, and the assistance piston 16 acts on a second point P2, on the reaction plate 18. As a person skilled in the art knows, the points P1 and P2 can correspond to surfaces. For example, the point P2 corresponds to an annular surface in the case of a tubular assistance piston 16.

In this way, the overall braking force Fg and a third adjustment travel s3 can be transmitted to a component, such as for example the output piston 20, which is arranged on the outside of the coupling element. In this case, the output piston 20 is in contact with the reaction plate 18 at a third point P3, or at a corresponding one.

A quotient x gives the ratio of a first distance between the points P2 and P3 and of a second distance between the points P3 and P1. In the case of an elastic reaction plate 18, the latter is deformed in the case of a driver braking force Ff≠0 and/or an assistance force Fu≠0 (not illustrated in FIG. 1B). The bendability of the reaction plate 18 can be given as elasticity e.

The output piston 20 is coupled to an adjustable component 21 of a force/pressure conversion element, for example of a master brake cylinder 22. A brake circuit (not included in the sketch) which is filled with a braking medium and which has at least one wheel brake cylinder is connected to the force/pressure conversion element. The at least one assigned wheel can be braked by changing a brake pressure in the at least one wheel brake cylinder.

However, the operation of a conventional brake booster entails multiple disadvantages. For example, making available an assistance force Fu≠0 when the vehicle is in a stationary state and/or in the case of activation of a further additional braking torque which acts, in addition to the overall braking torque made available via the overall braking force Fg, on at least one of the wheels of the vehicle, generally leads to unnecessary energy consumption by the brake system. Furthermore, vibration of the third adjustment travel s3, for example in the event of operation of a pump of the brake system, brings about corresponding vibration of the first adjustment travel s1 owing to the bendability of the coupling element. The associated movement of the activation element is frequently irritating to the driver. It is therefore desirable to have a boosted brake system with a reduced energy consumption and/or an improved operator control comfort when activating the activation element.

SUMMARY OF THE INVENTION

The invention provides a method for operating a boosted brake system of a vehicle and a control device for a boosted brake system of a vehicle.

The energy consumption of the brake booster can be reduced by adapting the assistance force to the operating mode. At the same time, the brake force boosting can be regulated. In particular, a reactive effect by an activated pump of the boosted brake system and/or a simultaneously applied additional braking torque on a position of the activation element of the boosted brake system can be prevented by means of the present invention. Likewise, by means of the present invention it is possible to compensate, instead of the activated pump, activation of a valve and/or switching of the EV (for example EV activation). The disruption occurring in the prior art as a result of an activated pump and/or a switched valve, which conventionally has an adverse effect on the pedal sensation, can therefore be eliminated. The method according to the invention and the corresponding control device can be used not only for simultaneously applying an additional braking torque but also in an ABS maneuver.

This ensures improved operator control comfort for the driver when activating the activation element.

The method according to the invention and the corresponding control device can be applied to a cost-effective brake system with a simple structure. Generally, no additional sensor system of the brake system is required to carry out the method and to use the control device.

BRIEF DESCRIPTION OF THE DRAWINGS

Further features and advantages of the present invention are explained below with reference to the figures, of which.

DETAILED DESCRIPTION

Figure 1A:
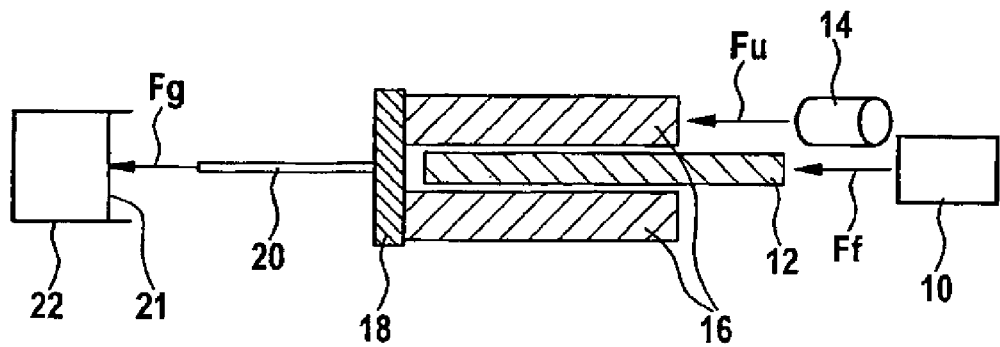
FIGS. 1A and B show schematic illustrations explaining the method of function of a conventional brake booster.
Figure 1B:
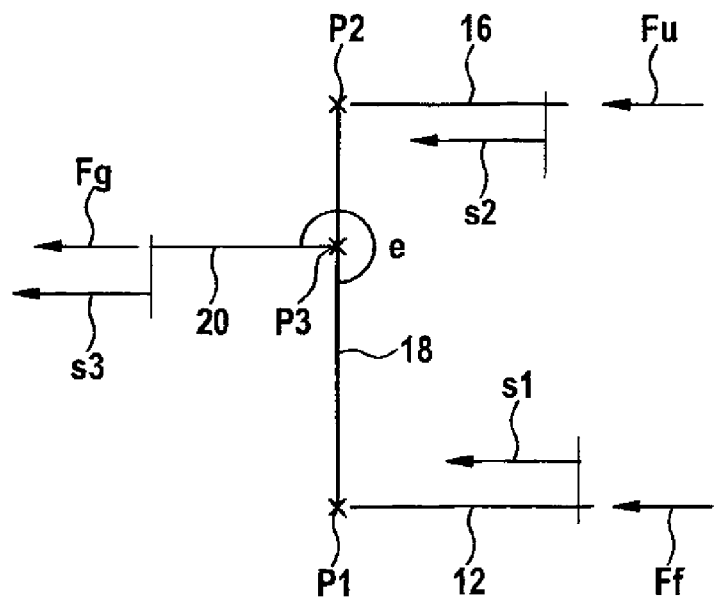
Figure 2:
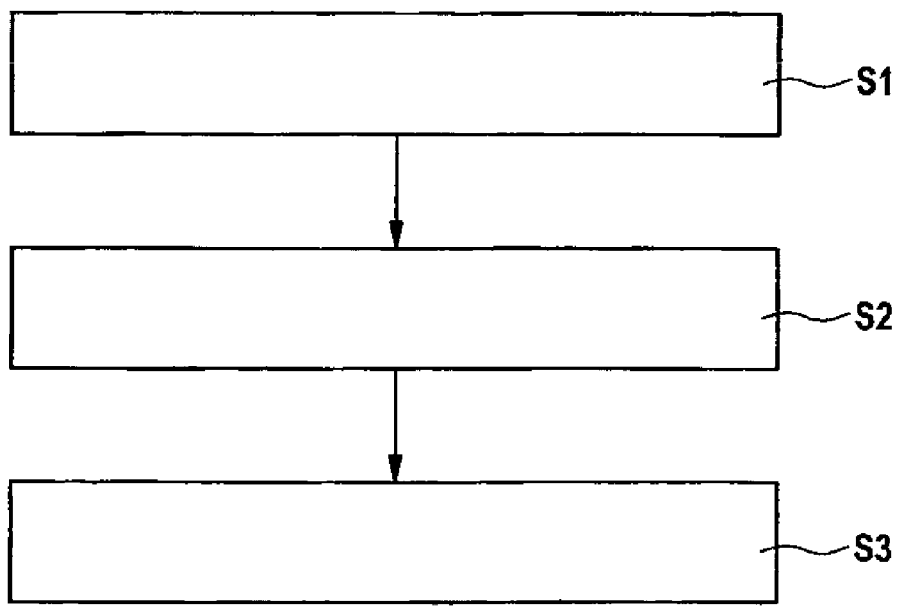
FIG. 2 shows a flowchart for illustrating a first embodiment of the method.

FIG. 2 shows a flowchart for illustrating a first embodiment of the method.

In a method step S1 it is checked whether, in a present operating mode of a boosted brake system which is being operated by means of the method, an overall braking torque which is applied to at least one wheel of the vehicle corresponds to a predefined setpoint overall braking torque and/or whether displacement of a braking medium volume into a force/pressure conversion element is carried out. For example, in this context the overall braking torque can be measured and subsequently compared with the predefined setpoint overall braking torque. Correspondingly, the braking medium volume which is displaced into the force/pressure conversion element can also be detected by means of a pressure sensor.

As an alternative to this, in method step S1 it is possible to determine whether, in the operating mode of the boosted brake system, in addition to the applied overall braking torque, an additional braking torque, for example a generator braking torque, is activated. It is therefore also possible to indirectly detect deviation of the overall braking torque from the advantageous setpoint overall braking torque.

Furthermore, in a preceding method step (not included in the sketch), a stationary state of the vehicle can be determined with the boosted brake system. Insofar as the vehicle is already stationary, a setpoint overall braking torque is reduced. For example, the setpoint overall braking torque can be set to zero. Likewise, the setpoint overall braking torque can be set to a value at which undesired rolling away of the vehicle is ensured even in the case of a positive gradient. In the subsequent method step S1 it is checked (with the reduced setpoint overall braking torque) whether the applied overall braking torque differs significantly from the reduced setpoint overall braking torque in the operating mode of the boosted brake system.

The displacement of the braking medium volume, for example of a brake fluid volume or of a braking gas volume, into the force/pressure conversion element can also take place indirectly in method step S1 by virtue of the fact that it is determined whether, in the activated operating mode of the boosted brake system, a pump of the boosted brake system is switched into a pumping mode in which a braking medium volume is displaced into the force-pressure conversion element. The pump may be, for example, a feedback pump.

If it is detected in the method step Si that a difference in braking torque between the applied overall braking torque and the predefined setpoint overall braking torque is greater than a predefined reference difference and/or that the braking medium volume displaced into the force/pressure conversion element is greater than a predefined reference volume, the method step S2 follows, otherwise, the method is ended. The predefined reference difference and/or the predefined reference volume can be equal to zero. In this case, a comparison of the difference in braking torque with the reference difference and/or a comparison of the displaced braking medium volume with the reference volume is dispensed with. As an alternative, the reference difference and/the reference volume can be predefined as a function of a vehicle state, a vehicle operating mode and/or a state of the surroundings.

In the following method step S2, a setpoint change in the assistance force is defined with respect to an assistance force made available by a brake booster of the boosted brake system, taking into account the difference in braking torque and/or the displaced braking medium volume. The setpoint change in the assistance force can be dependent, for example, on the operating mode. The setpoint change in the assistance force is preferably defined in such a way that, owing to the change in a brake booster braking torque which is generated by the brake booster, the updated overall braking torque is equal to the predefined setpoint overall braking torque. For example, the change in the brake booster braking torque corresponds to the additional braking torque. In the case of a displaced braking medium volume which is greater than the predefined reference volume, the setpoint change in the assistance force is preferably defined such that the setpoint change in the assistance force corresponds to an adjustment force, brought about by the displaced braking medium volume, acting on an adjustable component of the force/pressure conversion element, to which component the brake booster is directly or indirectly coupled.

In a further method step S3, the defined setpoint change in the assistance force is made available to the brake booster. In this context, the brake booster is, in particular, actuated in such a way that the setpoint change in the assistance force is implemented by the brake booster.

By means of the changing of the assistance force, made available by the brake booster, in accordance with the setpoint change in the assistance force, an additional braking torque can therefore be simultaneously applied by changing the brake booster braking torque generated by the brake booster, in such a way that a preferred overall braking torque is maintained in accordance with the setpoint overall braking torque. This is advantageous, in particular, when there is an additional braking torque which varies over time. Likewise, by means of the change in assistance force in accordance with the setpoint change in the assistance force, it is possible to compensate the adjustment force which is brought about by the displaced braking medium volume and which could otherwise influence a position of an activation element which is directly or indirectly coupled to the adjustable component of the force/pressure conversion element, and could therefore bring about a movement of the activation element which is irritating for a driver.

The method described in the paragraphs above is advantageous in particular in the case of regenerative braking in which part of the movement energy of the vehicle is converted into electrical energy. The generator torque, which brings about additional braking of the vehicle, is generally dependent on a speed of the vehicle. The generator torque therefore changes during the braking These highly fluctuating decelerations of the vehicle which occur despite constant activation of the brake pedal are often irritating for the driver.

From the prior art it is known to implement adaptation of the overall braking torque to the generator torque and to keep a pedal travel constant by decoupling the activation element completely from the master brake cylinder. In this case, the activation element is connected to a pedal travel simulator, while the increase in pressure in the hydraulic brake system is brought about only by a braking force which is made available externally. However, complete decoupling of the brake pedal from the master brake cylinder is risky since in the event of failure of the component which makes available the braking force the driver cannot make up for the loss of the braking force by means of the driver braking force.

The method described in the paragraphs above can also be implemented in the case of mechanical coupling of the activation element to the master brake cylinder, and therefore ensures an improved safety standard of the boosted brake system which is operated by means of the method.

FIGS. 3A to D show schematic illustrations of a coupling mechanism of a brake system for illustrating a second embodiment of the method.

The illustrated coupling mechanism comprises the components 10 to 22 already described. However, it is to be noted that the possibility of implementing the method is not restricted to such a coupling mechanism. For example, instead of the reaction plate 18, another brake booster activation element coupling element can be used for adding the driver braking force Ff and the assistance force Fu to form the overall braking force Fg. In this context, the overall braking force Fg can also comprise at least one additional source, details on which are not given in the text which follows. Furthermore, the possibility of implementing the method is not restricted to a certain embodiment of a brake circuit which is filled with a brake gas or a brake fluid. For example, various alternative possibilities relating to the volume management in the brake system are conceivable.

The brake booster 14 can be, for example, an electromechanical brake booster, an electric brake booster, a vacuum brake booster and/or a hydraulic brake booster. Of course, multiple brake boosters 14 can also be used for making available the assistance force Fu. The brake booster 14 is preferably configured to provide braking force assistance in a manner which can be regulated. The brake booster 14 is preferably configured to define the assistance force Fu as a function of the driver braking force Ff and/or the first adjustment travel s1. It is therefore obvious to a person skilled in the art that the possibility of implementing the method is not restricted to a certain type of brake booster 14.

Figure 3A:
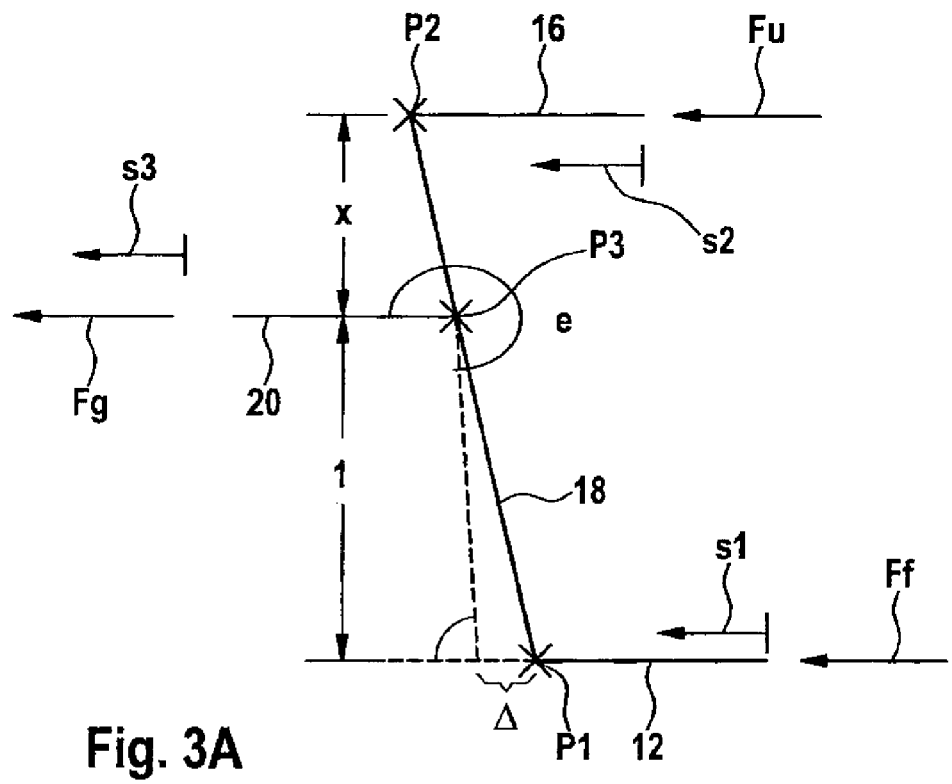
FIGS. 3A to D show schematic illustrations of a coupling mechanism of a brake system for illustrating a second embodiment of the method.

FIG. 3A shows an equivalent model for illustrating deformation of the reaction plate 18 in the case of a driver braking force Ff ≠ 0 and an assistance force Fu≠0. The points P1 to P3 correspond to surfaces on the reaction plate 18. If the point P1 is adjusted with respect to the point P3 by a bending variable A of the reaction plate 18, the following applies:

$$s1=s3+\Delta \quad \text{(Equation 1)}$$

Adjustment of the output piston 20 by the third adjustment travel s3 therefore generally brings about adjustment of the input piston 12 and of the activation element 10 by the first adjustment travel s1.

The following is obtained from the equilibrium of moments at the reaction plate 18:

$$\Delta *e = Ff - x*Fu \quad \text{(Equation 2)}$$

By inserting the equation (Equation 2) into the equation (Equation 1), the following is therefore obtained:

$$s1=s3+(Ff-x*Fu)/e \quad \text{(Equation 3)}$$

The relationship corresponding to the equation (Equation 3) between the first adjustment travel s1 of the activation element 10 and the third adjustment travel s3 of the output piston 20 conventionally often leads to an adverse effect on the activation comfort of the activation element 10. For example, owing to the relationship a change in pressure in the force/pressure conversion element and/or in the brake circuit can bring about a movement of the activation element 10 which is irritating for the driver. This disadvantage can be prevented by means of the method described below.

Figure 3B:
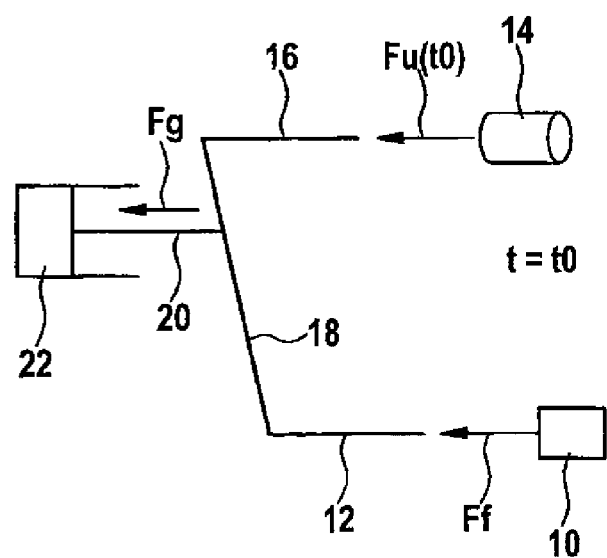

FIG. 3B shows the coupling mechanism with the components 10 to 22 at a time t=t0 before a start of the method. For the sake of illustration, it is assumed below that during the entire method the driver applies a chronologically constant driver braking force Ff and a chronologically constant first adjustment travel s1 to the activation element 10 and at the time t0. Correspondingly, at the time t0 a chronologically constant assistance force Fu and a chronologically constant second adjustment travel s2 are made available by the brake booster 14. However, the method described below is not restricted to a chronologically constant activation of the activation element 10 by the driver.

A constant hydraulic braking torque Mh therefore acts proportionally to the overall braking force Fg on at least one wheel which is assigned to the brake circuit, wherein the hydraulic braking torque Mh is obtained from a brake pressure p and a constant C:

$$Mh=C*p \quad \text{(Equation 4)}$$

At a time t>t0, an additional braking torque Mz is activated. The additional braking torque Mz is, for example, a generator braking torque. Instead of a generator braking torque, it is, however, also possible to simultaneously apply another additional braking torque Mz by means of the described method.

The overall braking torque Mg(t>t0) is therefore composed of the hydraulic braking torque Mh(t>t0) and the additional braking torque Mz(t>t0):

$$Mg(t>t0)=Mh(t>t0)+Mz(t>t0) \quad \text{(Equation 5)}$$

The method described below can also be carried out insofar as, for example, a generator braking torque is reduced and Mz(t>t0) is negative.

Despite the additional braking torque Mz(t>t0)≠0, it is desirable, given a constant activation of the activation element 10 by the driver, to maintain an overall braking torque Mg(t>t0)=Mg(t0). For this purpose, the method steps S1 to S3 already described above are carried out.

For example, in method step S2, firstly a pressure difference Δp, by which the brake pressure p in the wheel brake cylinders has to be changed, is determined so that the overall braking torque Mg(t>t0)=Mg(t0) is maintained.

$$\Delta p=Mz(t>t0)/C \quad \text{(Equation 6)}$$

The brake pressure p is preferably changed by the pressure difference Δp by means of the admission pressure in the master brake cylinder 22. In this context it is advantageous to change the admission pressure by a setpoint change ΔFg in the braking force by means of a change in the overall braking force Fg, where $$\Delta Fg=A*Mz(t>t0)/C, \quad \text{(Equation 7)}$$

where A corresponds to an area of a force/pressure conversion element, for example of the master brake cylinder 22.

Since a change in the driver braking force Ff is not desired in order to bring about the setpoint change ΔFg in the braking force, the assistance force Fu which is made available by the brake booster 14 is changed in accordance with the setpoint change ΔFg in the braking force. As a result, the following applies for a setpoint change ΔFu in the assistance force:

$$\Delta Fu=A*Mz(t>t0)/C \quad \text{(Equation 8)}$$

Figure 3C:
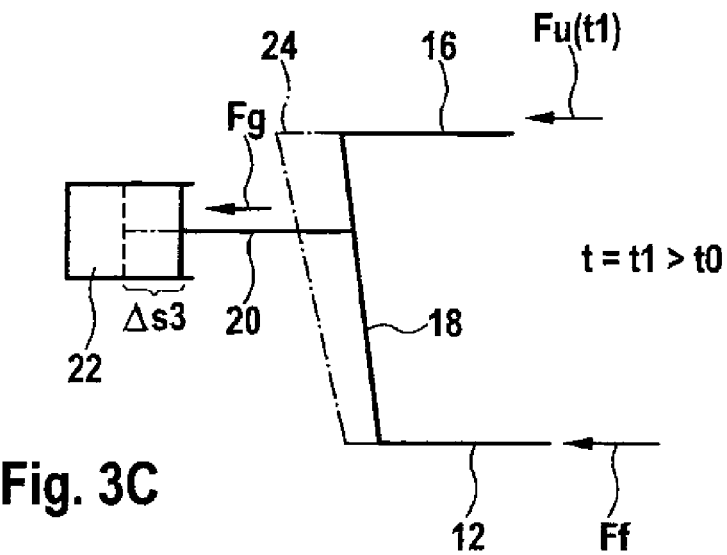

FIG. 3C shows the coupling mechanism after the method steps S1 to S3 have been carried out at a time t1>t0. Therefore, at the time t1, the brake pressure p is preferably set such that the overall braking torque Mg(t1) which is applied to at least one wheel at the time t1 corresponds to the overall braking torque Mg(t0) at the time t0, i.e. the following applies: Mg(t1)=Mg(t0).

Uniform braking of the vehicle is maintained in accordance with the chronologically constant driver braking force Ff. The assistance force Fu(t1) at the time t1 corresponds to a difference between the assistance force Fu(t0) at the time t0 and the setpoint change ΔFu in the assistance force.

As a result of a decrease in the admission pressure, the brake pressure p is automatically reduced in all wheel brake cylinders of the brake system. Therefore, the reduction in the admission pressure also becomes noticeable on the wheels not connected to the generator. In this way, a larger generator torque can be simultaneously applied.

However, a change in the assistance force Fu leads not only to a change in the brake pressure p but rather also to a change in the volume of at least one component of the brake system, for example of the master brake cylinder 22. Said change in the volume of the at least one component of the brake system has a direct effect on the third adjustment travel s3. Therefore, the setpoint change ΔFu in assistance force causes a displacement Δs3 of the output piston 20.

In order to prevent the first adjustment travel s1 according to equation (Equation 3) being changed in accordance with the displacement Δs3 of the output piston 20, the method steps described below are carried out. For example, in this way it is possible to prevent a rebound of the activation element 10.

Furthermore, by means of the change in the assistance force Fu in accordance with the setpoint change ΔFu in the assistance force, the reaction plate 18 is deformed according to equation (Equation 2). (For the sake of illustration, the "shape" of the reaction plate 18 at the time t0 is entered as a dashed line 24 in the equivalent models in FIGS. 3C and D). It is advantageous also to take this effect into account in the further method steps.

In a further method step, a pressure change variable with respect to a pressure change, which in the force/pressure conversion element corresponds to the setpoint change ΔFu in the assistance force is determined. The pressure change variable is, for example, a volume change V(t0→t1), corresponding to the setpoint change ΔFu in the assistance force, of the force/pressure conversion element and/or the displacement Δs3 of the output piston 20, where the following applies:

$$\Delta s3 = V(t0 \to t1)/A \qquad \text{(Equation 9)}$$

The pressure change variable Δs3 or V(t0→t1) can, for example, be obtained from a pressure/volume characteristic curve or a pressure/displacement travel characteristic curve of the brake circuit.

In addition, a change in shape variable with respect to a change in shape, corresponding to the defined setpoint change in the assistance force, of at least one brake booster activation element coupling element arranged between the brake booster and the force/pressure conversion element is determined. The change in shape variable is, for example, the bending variable A of the reaction plate 18.

In a subsequent method step, a setpoint volume change/setpoint pressure change corresponding to the pressure change variable and/or the change in shape variable is defined in the force/pressure conversion element. In this context, a setpoint volume change ΔV is determined which compensates the pressure change variable Δs3 or V(t0→t1) and/or the change in the bending variable Δ up to the time t2.

In particular the following can apply here:

$$s1(t2) = s1(t0) \qquad \text{(Equation 10)}$$

On the basis of the preceding equations (Equation 1) to (Equation 3), the following can be defined, for example, as the setpoint volume change ΔV:

$$\Delta V = A^*(\Delta s3 + x^* \Delta Fu/C) \qquad \text{(Equation 11)}$$

As a result, when the setpoint volume change ΔV is defined it is possible to take into account the fact that the change in the assistance force corresponding to the setpoint change ΔFu in the assistance force brings about a change in the capacity of the brake system by V(t0→t1) or Δs3, and (owing to the elasticity of the reaction plate 18) triggers deformation of the reaction plate 18. The two effects counter one another, for which reason, for example, a positive Δs3 leads to a negative term (x*ΔFu/C).

As a person skilled in the art knows, in the method described here, the maintenance of the deceleration of the vehicle and the maintenance of the first adjustment travel s1 are decoupled and carried out independently of one another.

In a further method step, the defined setpoint pressure change and the defined setpoint volume change ΔV are output to at least one actuating element of at least one brake circuit of the boosted brake system. A usable actuating element is, for example, a device for regulating the wheel pressures. The actuating element can already be present, for example, as an ABS system, as an ESP system or as a bypass valve on a conventional brake system. This multifunctionality of the actuating element permits the method described here to be carried out cost-effectively. Furthermore, the pressure distribution by means of the ESP system or the ABS system can also be carried out on a wheel-specific and axle-specific basis.

In order to keep chronologically constant not only the deceleration of the vehicle but also the first adjustment travel s1 given the same driver braking force Ff, it is advantageous to implement the setpoint volume change ΔV calculated according to equation (Equation 11) by displacing a braking medium into a storage chamber or out of the storage chamber of the brake system. In an ABS system or in an ESP system, a braking medium volume corresponding to the setpoint volume change ΔV can be decreased into the existing storage chamber via the outlet valves. A braking medium volume can be fed back via the feedback pump.

However, as a person skilled in the art can recognize, the possibility of implementing the method described here is not restricted to an ABS system or to an ESP system. An electric handbrake can also be used to carry out the method described here. In addition to bypass valves, by means of which a braking medium volume can be discharged from the brake system into a braking medium reservoir, corresponding modifications to the master brake cylinder 22 are also conceivable. The latter can preferably be actuated by means of an ESP system, a brake booster and/or a generator.

Figure 3D:
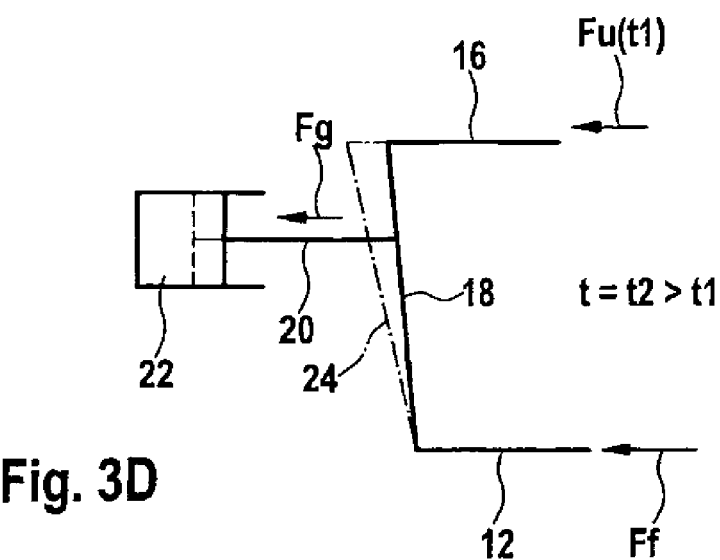

FIG. 3D shows the coupling mechanism at the time t2 after implementation of the setpoint volume change ΔV by means of a component of the brake system which is suitable for distributing the braking medium in the brake circuit. In this context, the adjustment travel s1(t2) at the time t2 preferably corresponds to the adjustment travel s1(t0) predefined at the time t0, i.e. the following applies: s1(t2)=s1(t0).

As a result, a chronologically constant adjustment travel s1 is ensured by means of the implementation of the method described despite the additional braking torque Mz which is unequal to zero given a chronologically constant driver braking force Ff. The driver therefore does not notice anything about the activation of the additional braking torque Mz. The method described in the paragraphs above therefore ensures improved driving comfort for the driver.

As a person skilled in the art knows, the method steps described in the paragraphs above can be carried out so quickly that the time interval between the times t0 and t2 approaches zero. The first adjustment travel s1 therefore remains chronologically constant.

In the embodiment of the method described above, the degree of regeneration (percentage of the possible regeneration capability) of the brake system is obtained from a gain factor f, insofar as the following applies:

$$Fu = f * Ff \qquad \text{(Equation 12)}$$

Given maximum regeneration, the assistance force Fu is reduced to zero, and only the driver braking force Ff is braked into the braking system. As a result, the overall braking force Fg can be reduced at maximum by the absolute value Fg*f/(f+1). If the brake booster boosts, for example, the driver braking force Ff by a factor of 5, i.e. the factor f is equal to 4, given a constant overall braking torque Mg, at maximum an additional braking torque Mg which is equal to 0.8 Mg can be simultaneously applied. The degree of regeneration is therefore 80%.

Figure 4:
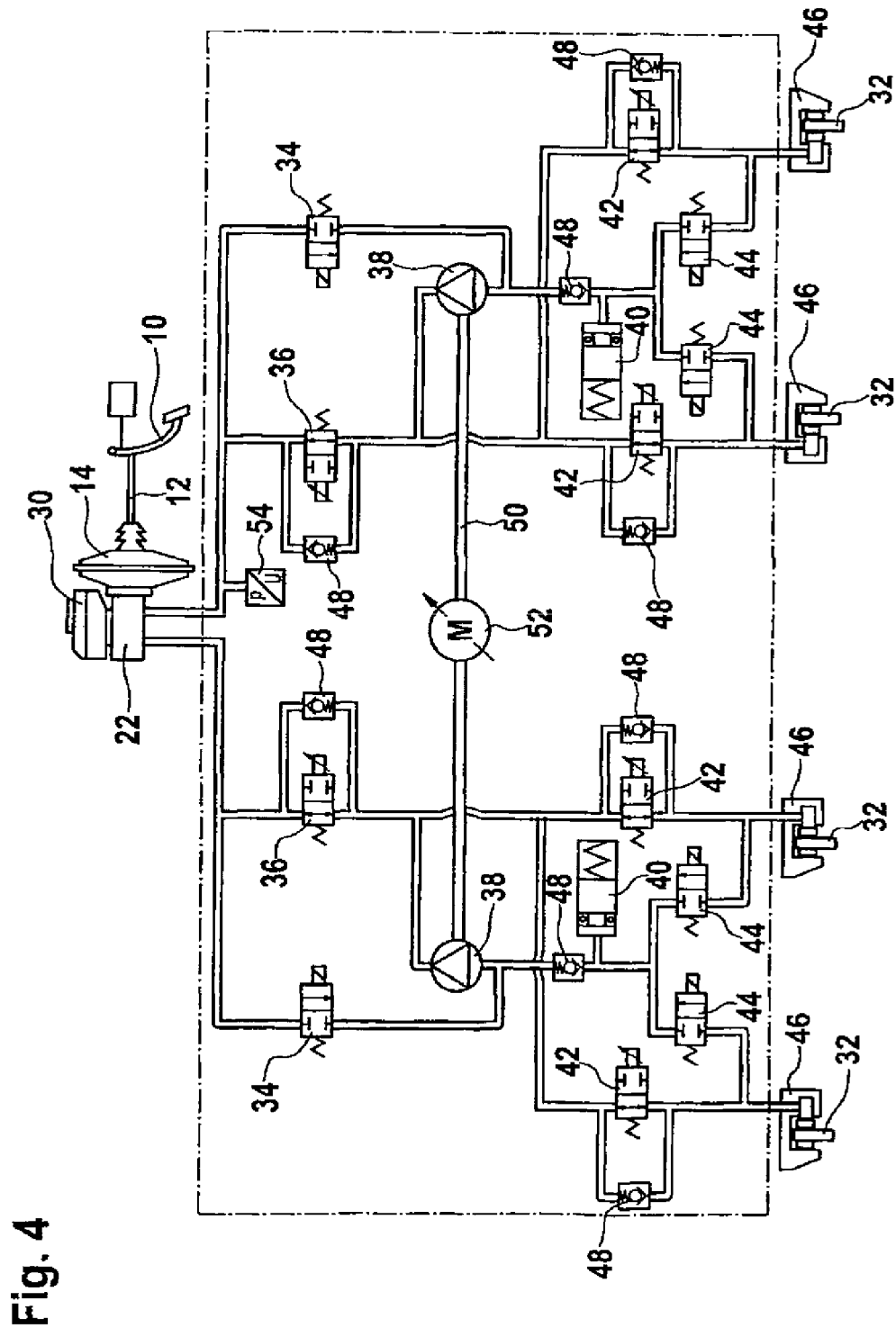
FIG. 4 shows a brake system with which developments of the method can be carried out.

FIG. 4 shows a brake system with which developments of the method can be implemented.

The brake system comprises an activation element 10, an input piston 12, a brake booster 14, a braking medium reservoir 30 and a master brake cylinder 22 to which two brake circuits are coupled. Each of the brake circuits is designed to brake two wheels 32. Each of the brake circuits therefore comprises an intake valve (main switching valve) 34, a switchover valve 36, a feedback pump 38, a storage chamber 40, two wheel inlet valves 42, two wheel outlet valves 44 and two wheel brake cylinders 46. Instead of switching valves, it is possible to use outlet valves 44 which can be adjusted (regulated) continuously. This minimizes the noises occurring during the switching of the outlet valves 44 and improves the metering capability in the case of a reduction in pressure. In each case a non-return valve 48 is arranged parallel to each switchover valve 36 and each wheel inlet valve 42. In each case a further non-return valve 48 is inserted between a feedback pump 38 and a storage chamber 40. The two feedback pumps 38 are seated on a shaft 50 of a motor 52.

A pressure sensor 54 is arranged at least in one of the two brake circuits. For example a master brake cylinder pressure, a circuit pressure, a wheel pressure, a storage chamber pressure and/or a storage chamber volume can be measured by means of the pressure sensor 54. The pressure sensor 54 is preferably a master brake cylinder pressure sensor or a circuit pressure sensor. Instead of measuring a pressure value, the pressure value can also be calculated or estimated.

In the methods described above, an additional braking torque can be simultaneously applied only for as long as the assistance force is reduced to zero. The gain factor of the brake booster 14 defines the degree of regeneration here.

In the development described below, not only a setpoint change in the assistance force but also a setpoint change in the braking pressure are defined by taking account of the additional braking torque to be simultaneously applied. In this way, it is possible to implement a relatively high degree of regeneration of the brake system (up to 100%) and/or to combine a relatively large additional braking torque.

Two possible procedures for simultaneously applying an additional braking torque which is greater than a (hydraulic) braking torque which can be generated by the assistance force are described below:

In a first procedure, one of the methods described above is carried out until the assistance force is reduced to zero, i.e. until the pressure in the brake system is provided solely by the driver braking force. For the further simultaneous application of braking torque, an additional reduction in pressure is carried out at the wheels. This can be done using an ABS system or an ESP system. For example, the reduction in pressure at the wheels is carried out by closing the inlet valves 42 and decreasing the wheel pressure by means of the outlet valves 44. In this context, the braking medium can be displaced into the storage chambers 40. Closing the inlet valves 42 ensures that a displacement of volume between the inlet valves 42 and the master brake cylinder 22 is prevented. The additional reduction in pressure therefore does not lead to adjustment/vibration of the activation element 10. The driver who activates the activation element 10 therefore does not notice the additional reduction in pressure.

An additional reduction in pressure preferably takes place in a pressure range which is significantly lower than a brake pressure corresponding to the driver braking force. As a result, the brake regulating system which is used for the additional regeneration has to be configured only for these minimum pressure ranges and volume ranges. If the brake booster makes available, for example, an assistance force which is four times as large as the driver braking force, at maximum 20% of the overall braking force has to be simultaneously applied via the additional regeneration. It is therefore assumed that the additional regeneration is used only at a maximum of 100 bar, only a master cylinder pressure of at maximum 20 bar is therefore built up.

In a second procedure, the inlet valves 42 can be switched even before reducing the assistance force to zero into a (regulated) operating mode in which closed-loop control/open-loop control can be performed on differential pressures and/or volume flows by means of the inlet valves 42. For example, the inlet valves 42 are switched to "delta p control". In this way, the reactive effect of the volume displacement on the activation element 10 can be significantly reduced. This ensures that the closing of the inlet valves 42 triggers neither a noise nor a reactive effect on the activation element 10. Instead of the hard transition, which can occur in the first procedure when the inlet valves 42 close (given an assistance force equal to zero), a soft transition can therefore be implemented in the second procedure.

The inlet valves 42 are preferably not closed completely until the assistance force is reduced to zero, in order to ensure a chronologically constant first adjustment travel of the activation element 10. However, the closing of the inlet valves 42 can of course already occur before the assistance force is reduced to zero. In this case, the brake booster can make available a residual force during the further simultaneous application of the additional braking torque.

Possible ways of increasing again the hydraulic braking torque which is reduced by means of the additional braking torque will be described below. It is to be assumed here that the additional braking torque is reduced or deactivated, and therefore a relatively large hydraulic braking torque is advantageous to maintain a preferred overall braking torque.

Firstly, the additional reduction in pressure, which was implemented at the wheels for the purpose of further simultaneous application of pressure, is reversed. The pressure in the brake system is therefore increased (again). This takes place by feeding the previously displaced volume of the braking medium back into the brake system again. The feedback pumps 38 are advantageously used to pump the displaced braking medium out of the storage chamber 40. The increase in pressure in a wheel brake cylinder 46 can take place by means of suitable closed-loop/open-loop control of the feedback pumps 38, of the inlet valves 42 and of the outlet valves 44, in such a way that the increase in pressure corresponds to a simultaneous reduction in the additional braking torque. This ensures a chronologically constant overall braking torque.

Before this method step is carried out, it is possible to determine whether a pressure between the master brake cylinder 22 and the inlet valves 42 differs from the wheel brake pressure. In such a situation it is advantageous to actuate the brake system in such a way that the braking medium volume between the master brake cylinder 22 and the inlet valves 42 does not change, in order to prevent a reactive effect of a displaced braking medium volume on the activation element 10. The feedback pumps 38, the inlet valves 42 and/or the outlet valves 44 are preferably actuated in such a way that a displaced braking medium volume only brings about an increase in pressure in the wheel brake cylinders 46. This can easily be implemented insofar as the pressure between the master brake cylinder 22 and the inlet valves 42 is higher than the wheel pressure, and the braking medium volume can therefore be displaced to the wheel brake cylinders 46 via the inlet valves 42.

In a further method step, the restoration of the hydraulic braking torque can be carried out by increasing the assistance force made available by the brake booster. In particular, the hydraulic braking torque can be increased without pressure management in the brake system in this context.

A possible disadvantage with respect to the increasing of pressure by operating the feedback pumps 38 is that the feedback pumps 38 frequently generate a pulsating volume flow. This pulsating volume flow often causes the activation element 10 to vibrate, which is generally irritating to the driver. However, this problem can be overcome by decoupling the feedback pumps 38 from the master brake cylinder 22 in such a way that a volume flow from a feedback pump 38 to the master brake cylinder 22 can be prevented. For example, in the case of an ESP system, the advantageous decoupling of the feedback pump 38 from the master brake cylinder 22 can easily be brought about by means of the switchover valve 36. As an alternative to a switchover valve 36, another, corresponding isolating valve can also be inserted between an inlet valve 42 and the master brake cylinder 22 (also outside the brake regulating system). For example, an ABS system which is equipped with the additional isolating valve can be used for advantageously decoupling the feedback pumps 38.

This advantageous development of the method is based on the knowledge that during the feeding of volume through the feedback pumps 38, the reactive effects on the activation element can be prevented by actuating an isolating valve. For example, the assistance force is reduced to zero, and the inlet valves 42 are closed. In order to minimize a reactive effect of the increase in volume by means of the feedback pumps 38 on the activation element 10 in such a situation, the switching valve 36 can be closed. Before the start of the feeding of volume, the pressure between the master brake cylinder 22 and the switching valve 36 is in this case equal to the pressure between the switchover valve 36 and the inlet valve 42. When the feeding of volume starts, pressure or volume in the brake circuit between the switchover valve 36 and the inlet valve 42 is increased since both valves 36 and 42 are closed. The pressure or volume between the switching valve 36 and the master brake cylinder 22 does not change. Reactive effects on the activation element 10 are therefore prevented.

The transition from the closed switchover valve 36 to the opened switchover valve 36 can take place as a simple opening process (complete evacuation) of the switchover valve 36 or by means of a transition phase (delta p control).

Furthermore, there is the possibility of using the brake booster 14 to compensate the pulsating volume flow of the feedback pumps 38. In this context, during the feeding of a volume by the feedback pump 38, the assistance force of the brake booster 14 is varied in such a way that it counteracts the pulsating volume flow. In this way, the reactive effects of the pulsating volume flow on the activation element 10 can be prevented.

It is possible here to dispense with a switchover valve 36 or a similar isolating valve between a feedback pump 38 and the master brake cylinder 22. The compensation of the pulsating volume flow by means of the brake booster 14 is therefore advantageous in particular in an ABS system.

During the compensation of the pulsating volume flow by means of the brake booster 14, the assistance force is preferably not reduced to zero, so that both an increase and a reduction in the assistance force can be implemented. The assistance force can therefore be adapted in any pump stroke in such a way that the pump stroke does not bring about any adjustment to the activation element 10. The assistance force, as it were, actively counteracts the pulsating volume flow.

The reaction of the elastic coupling element, for example a reaction plate, which is brought about by the change in the assistance force can be taken into account in the actuation of the assistance force in order to compensate the pulsating volume flow. The present invention therefore permits the assistance force of the brake booster 14 to be adapted in such a way that a reactive effect of a pump on an activation element of a brake system is compensated.

The invention claimed is:

1. A method for operating a boosted brake system of a vehicle, the method comprising:
    checking an operating mode of the boosted brake system;
    determining a difference between an overall braking torque (Mg) applied by the boosted brake system to at least one wheel (32) of the vehicle and a predefined setpoint overall braking torque and/or a braking medium volume displaced into a force/pressure conversion element (22) of the boosted brake system (S1);
    defining an operating-mode-dependent setpoint change (ΔFu) in assistance force in relation to an assistance force (Fu) provided by a brake booster (14) of the boosted brake system when the difference between the overall braking torque (Mg) applied by the boosted brake system to at least one wheel (32) of the vehicle and the predefined setpoint overall braking torque is greater than a predefined threshold and/or the difference between the braking medium volume displaced into a force/pressure conversion element (22) of the boosted brake system (S1) is greater than a predefined reference volume; and
    outputting the setpoint change (ΔFu) in assistance force to the brake booster (14) (S3);
    wherein the change in assistance force to the brake booster (14) averts movement of an activation element (10).

2. The method as claimed in claim 1, wherein it is checked whether, in the operating mode of the boosted brake system, in addition to the applied overall braking torque (Mg), a further braking torque (Mz) is activated which is greater than the predefined reference difference.

3. The method as claimed in claim 2, wherein it is checked whether, in the operating mode of the boosted brake system, as a further braking torque (Mz) a generator braking torque (Mz) is activated which is greater than the predefined reference difference.

4. The method as claimed in claim 1, wherein, in addition to the definition of the setpoint change (ΔFu) in the assistance force, a change in setpoint brake pressure is defined taking into account the difference (Mz) in braking torque, and wherein the defined setpoint change in brake pressure is output to at least one actuating element (38, 42, 44) of at least one brake circuit of the boosted brake system.

5. The method as claimed in claim 1, wherein when the vehicle is in a stationary state a setpoint overall braking torque is reduced, and in the case of the reduced setpoint overall braking torque it is checked whether in the operating mode of the boosted brake system the applied overall braking torque (Mg) differs from the reduced setpoint overall braking torque by at least the predefined reference difference.

6. The method as claimed in claim 1, wherein a pressure change variable ($\Delta s3$, $V(t0 \rightarrow t1)$) with respect to a pressure change in the force/pressure conversion element (22) which corresponds to the setpoint change ($\Delta Fu$) in the assistance force is determined.

7. The method as claimed in claim 6, wherein a setpoint volume change ($\Delta V$) corresponding to the pressure change variable ($\Delta s3$, $V(t0 \rightarrow t1)$) is defined in the force/pressure conversion element (22), and wherein the defined setpoint volume change ($\Delta V$) is output to at least one actuating element (38, 42, 44) of at least one brake circuit of the boosted brake system.

8. The method as claimed in claim 1, wherein a change in shape variable ($\Delta$) relating to a change in shape, corresponding to the defined setpoint change ($\Delta Fu$) in assistance force, of at least one brake booster activation element coupling element (18) arranged between the brake booster (14) and the force/pressure conversion element (22) is determined.

9. The method as claimed in claim 8, wherein a setpoint volume change ($\Delta V$) corresponding to the change in shape variable ($\Delta$) is defined in the force/pressure conversion element (22), and wherein the defined setpoint volume change ($\Delta V$) is output to at least one actuating element (38, 42, 44) of at least one brake circuit of the boosted brake system.

10. The method as claimed in claim 1, wherein it is checked whether, in the operating mode of the boosted brake system, a pump (38) of the boosted brake system is switched into a pumping mode in which the braking medium volume which is displaced into the force/pressure conversion element (22) is greater than the predefined reference volume.

11. The method as claimed in claim 1, wherein a pressure change variable ($\Delta s3$, $V(t0 \rightarrow t1)$) with respect to a pressure change in the force/pressure conversion element (22) which corresponds to the setpoint change ($\Delta Fu$) in the assistance force is determined, a change in shape variable ($\Delta$) relating to a change in shape, corresponding to the defined setpoint change ($\Delta Fu$) in assistance force, of at least one brake booster activation element coupling element (18) arranged between the brake booster (14) and the force/pressure conversion element (22) is determined, and a setpoint volume change ($\Delta V$) corresponding to the pressure change variable ($\Delta s3$, $V(t0 \rightarrow t1)$) and the change in shape variable ($\Delta$) is defined in the force/pressure conversion element (22), and wherein the defined setpoint volume change ($\Delta V$) is output to at least one actuating element (38, 42, 44) of at least one brake circuit of the boosted brake system.

12. A control device for a boosted brake system of a vehicle, having:
a sensor device which is configured to check an operating mode of the boosted brake system including a difference between an overall braking torque (Mg) applied by the boosted brake system to at least one wheel (32) of the vehicle and a predefined setpoint overall braking torque and/or a displacement of a braking medium volume of the boosted brake system into a force/pressure conversion element (22) of the boosted brake system, and to make available information (Mz) corresponding to the difference (Mz) in braking torque and/or to the braking medium volume if the difference in braking torque (Mz) between the applied overall braking torque (Mg) and the predefined setpoint overall braking torque is greater than a predefined reference difference and/or the braking medium volume displaced into the force/pressure conversion element (22) is greater than a predefined reference volume;
an evaluation device which is configured to define a setpoint change ($\Delta Fu$) in the assistance force, dependent on the operating mode, with respect to an assistance force (Fu) made available by a brake booster (14) of the boosted brake system, taking into account the information (Mz) which is made available; and
an output device which is configured to output a control signal, corresponding to the defined setpoint change ($\Delta Fu$) in the assistance force, to the brake booster (14);
wherein the change in assistance force to the brake booster (14) averts movement of an activation element (10).

13. A boosted brake system having a control device as claimed in claim 12.

14. A vehicle having a boosted brake system as claimed in claim 13.

* * * * *